US008923191B2

(12) United States Patent
Hanson

(10) Patent No.: US 8,923,191 B2
(45) Date of Patent: Dec. 30, 2014

(54) INTERNET PROTOCOL COLLABORATIVE MOBILITY

(75) Inventor: Norman L. Hanson, Tehachapi, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 3642 days.

(21) Appl. No.: 10/125,128

(22) Filed: Apr. 17, 2002

(65) Prior Publication Data
US 2004/0202120 A1 Oct. 14, 2004

(51) Int. Cl.
H04W 4/00 (2009.01)
H04W 36/30 (2009.01)
H04W 80/00 (2009.01)
H04W 84/18 (2009.01)

(52) U.S. Cl.
CPC .............. H04W 36/30 (2013.01); H04W 80/00 (2013.01); H04W 84/18 (2013.01)
USPC .......................................................... 370/328

(58) Field of Classification Search
USPC .......................................................... 370/328
See application file for complete search history.

(56) References Cited

U.S. PATENT DOCUMENTS

| | | | | |
|---|---|---|---|---|
| 5,175,867 A * | 12/1992 | Wejke et al. | ................... | 455/439 |
| 5,267,261 A * | 11/1993 | Blakeney et al. | ............. | 370/332 |
| 5,301,356 A * | 4/1994 | Bodin et al. | ................... | 455/436 |
| 5,499,386 A * | 3/1996 | Karlsson | ...................... | 455/444 |
| 5,640,414 A * | 6/1997 | Blakeney et al. | ............. | 375/130 |
| 6,112,246 A * | 8/2000 | Horbal et al. | ................. | 709/230 |
| 6,144,671 A | 11/2000 | Perinpanathan et al. | | |
| 6,147,986 A * | 11/2000 | Orsic | ............................ | 370/349 |
| 6,161,123 A | 12/2000 | Renouard et al. | | |
| 6,195,705 B1 | 2/2001 | Leung | | |
| 6,256,300 B1 | 7/2001 | Ahmed et al. | | |
| 6,289,220 B1 * | 9/2001 | Spear | ............................ | 455/436 |
| 6,343,287 B1 | 1/2002 | Kumar et al. | | |
| 6,353,607 B1 * | 3/2002 | Valentine et al. | ............. | 370/349 |
| 6,452,920 B1 * | 9/2002 | Comstock | ...................... | 370/349 |
| 6,473,413 B1 * | 10/2002 | Chiou et al. | ................... | 370/331 |
| 6,510,144 B1 * | 1/2003 | Dommety et al. | ............. | 370/328 |
| 6,591,382 B1 * | 7/2003 | Molloy et al. | ................. | 714/704 |
| 6,600,734 B1 * | 7/2003 | Gernert et al. | ................. | 370/352 |
| 6,647,262 B1 * | 11/2003 | Demetrescu et al. | ......... | 455/436 |
| 6,799,204 B1 * | 9/2004 | Baba et al. | ..................... | 709/220 |
| 6,907,017 B2 * | 6/2005 | Reddy et al. | ................... | 370/331 |
| 6,947,398 B1 * | 9/2005 | Ahmed et al. | ................. | 370/331 |
| 6,965,584 B2 * | 11/2005 | Agrawal et al. | ............... | 370/331 |
| 7,006,828 B1 * | 2/2006 | Czaja et al. | ................... | 455/442 |
| 2001/0044305 A1 * | 11/2001 | Reddy et al. | .................. | 455/436 |
| 2001/0053133 A1 * | 12/2001 | Horikawa | ...................... | 370/328 |
| 2002/0046293 A1 * | 4/2002 | Kabata et al. | ................. | 709/245 |
| 2002/0118656 A1 * | 8/2002 | Agrawal et al. | ............... | 370/329 |
| 2005/0226197 A1 * | 10/2005 | Reddy et al. | .................. | 370/338 |

* cited by examiner

Primary Examiner — Ayaz Sheikh
Assistant Examiner — Blanche Wong
(74) Attorney, Agent, or Firm — Tarolli, Sunheim, Covell & Tummino LLP

(57) ABSTRACT

Systems and methods are provided for maintaining communications with mobile users within organizational logical network groups when transitioning between logical groups. A client mobility agent resides as part of a mobile communication unit and monitors link metrics to determine if a transition to another logical network group is desired. The client mobility agents and a server mobility agent collaborate to reassign or re-home a mobile communication unit to a new home logical network group, and provide the mobile communication unit with a new group address upon entering a new logical network. The server mobility agent collaborates with a server mobility agent of the previous logical group that the mobile communication unit was a member to transfer sessions and services associated with the mobile communication unit to the new logical network.

28 Claims, 10 Drawing Sheets

INTERNET PROTOCOL COLLABORATIVE MOBILITY

TECHNICAL FIELD

The present invention relates to communications and, more particularly, to membership transitions of mobile communication units between logical network groups.

BACKGROUND OF THE INVENTION

The use of communication systems having wireless mobile communication units has become widespread. Wireless communication systems provide several important advantages over conventional wired systems. For example, wireless communication users can communicate in locations where wired service is not available or feasible, such as remote or rugged locations. Additionally, wireless communication users have much more mobility because they do not have to connect to a fixed wired network. These and other favorable characteristics make wireless communications ideally suited for personal, business, military, search and rescue, law enforcement, and water vehicle applications. The power of networking and collaborative, distributed computing is being realized in wireless mobile communication units. However, mobile networks provide many additional challenges not associated with fixed networks.

Several important mobility management issues need to be addressed in designing a communication system with a dynamic network topology having mobile access points and/or mobile network nodes with a relatively large number of mobile users. Critical issues with mobile management include tracking mobile users in the system, reaching and initiating communications with mobile users and continuity of service when a mobile user moves between coverage areas. Conventional networks do not provide solutions to these problems within their specific domains. In conventional systems, a network administrator needs to reconfigure the respective networks and/or networks to accommodate the entry of a new mobile user. For example, if a user moves a laptop computer from a first network to a second network, the second network will need to be reconfigured to assign a new address (e.g., (Internet Protocol (IP) address) to the laptop computer to accommodate for the domain name associated with the laptop. A system administrator will have to then enter the domain name into the domain name server (DNS) for the second network and remove the domain name from the DNS of the first network. Both the first network and second network will then have to be rebooted to complete the configuration.

In mobile network environments, capabilities are required for allowing nomadic users to migrate from one logical network or sub-network to other logical networks or sub-networks without human interaction or network management interactions. Current solutions include Cellular Digital Pack Data (CDPD) networks, Cellular/Personal Communications Services (Cellular/PCS) systems, and Mobile Internet Protocol (mobile IP) networks. These solutions provide mobile users with fixed addresses or identifications and employ third party services to forward information destined for the mobile unit through one or more intermediaries to the network that the mobile user currently resides.

For example, mobile IP networks include mobile nodes, home agents and foreign agents. A home agent is a router that authenticates a mobile node, tracks a mobile user location and redirects data packets to the mobile user's current location. A foreign agent assists the mobile node in informing its home agent of its current location and routes data traffic sent by the mobile user. Similar to CDPD, mobile IP uses triangular routing. A mobile's home agent receives packets destined to the home address of the mobile user, encapsulates the packet and transmits the packet to the mobile node that the mobile user is currently residing. A mobile user must contact home in order to receive any services (e.g., e-mail, voice). The home agents are built into the network layer of a Transmission Control Protocol/Internet Protocol (TCP/IP) stack, and therefore, burdens the overhead associated with the network layer.

Additionally, the use of a home agent or third party service is impractical in some applications due to certain limitations. For example, recently the introduction of distributed denial of service (DDS) has become available to protect against users trying to access other user's systems and invoke destructive programs with fictitious names and addresses from the other user's system. Ingress filters detect packets launched with IP addresses not part of the transmitting packet and terminate this action. This terminates a mobile IP transmission since the mobile IP sent from the mobile user is foreign to the ingress filter. Furthermore, mobile IP is impractical for mobile tactical networks, since the node having the home agent can be destroyed eliminating any communication to the mobile node when it is at a visiting node.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for maintaining communications with mobile users within organizational logical groups (e.g., logical networks, subnetworks) when transitioning between logical groups. The present invention includes client mobility agents that reside in mobile communication units (MCUs) that collaborate with server mobility agents that are provided as part of network services of logical network groups. The client mobility agents and server mobility agents collaborate to reassign or re-home a mobile communication unit (MCU) to a new home logical network group and provide the MCU with a new group address upon entering a new logical network. The client mobility agent monitors link metrics (e.g., source addressing, link quality, bit-error rate, access point information) to determine if transition to another logical network group is desired. The client mobility agent requests a new logical group address (e.g., IP address) upon determining to transition to a new logical group.

The new logical address is provided by network services of the new logical group. The network services can be commercial off-the-shelf (COTS) software and hardware services that provide the desired new logical group address, associate a domain name with the new logical group address, and replicate the domain name and associated new logical group address to other network connected to the new logical group. Upon receipt of the new logical group address, the client mobility agent collaborates with the server mobility agents to invoke a transfer of information associated with the mobile communication unit. A server mobility agent of the new logical group collaborates with a server mobility agent of an old logical group from which the MCU is transitioning to have services (e.g., e-mail, phone) transferred to the new logical network group. Additionally, current communication sessions (e.g., Voice Over Internet Protocol (VOIP), Video) are transferred from the old network to the new network by collaboration between the new logical group server mobility agent and the old logical group server mobility agent to provide minimal disruption during a communication session. The current communications sessions are transferred prior to assignment of the new logical group address. The mobility functionality executes above the session layer without burdening the network layer of a TCP/IP or OSI network model.

In one aspect of the present invention, user mobility is provided using collaboration between intelligent mobility agents and standard TCP/IP suite network services. The TCP/IP suite services include Lightweight Directory Access Protocol (LDAP) Directory Services (DS), Domain Name Service with Dynamic Update or Dynamic Domain Name Server (DDNS), and Dynamic Host Configuration Protocol (DHCP). LDAP DS is a computer service that enables users to modify and access information stored in a computerized directory. DDNS (RFC 2136), part of a directory services that pairs domain names with IP addresses, enhances standard domain naming with the ability to dynamically update zone files keeping naming services current without requiring servers to be restarted. DHCP leases IP address to hosts when entering a domain and manages IP address while a host continues to operate in the domain. The TCP/IP suite services are provided as part of the available network services of a logical network group.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention provides for systems and methods for maintaining communications with mobile users within organizational groups (e.g., logical networks, subnetworks) when transitioning from group to group. Communication is maintained automatically and transparent to any human user interaction. The present invention provides a user mobility mechanism that operates completely above the session layer and without burdening the network layer with the tracking and location of mobile users. Intelligent mobility agents are provided in both logical network servers (server mobility agents) and MCUs (client mobility agents). The client mobility agents and server mobility agents collaborate to reassign or re-home a MCU to a new home group and new IP address upon entering a new logical network. The intelligent mobility agents can employ COTS software and hardware services to provide the desired mobility functionality above the session layers.

Groups consist of collections of users sharing communications, network services, and exist in the same relative geo-location. Connectivity within a group will be a combination of wireless and wired links forming a logical network or subnet within the greater network. The group operates as a flat network for all elements participating. Addressing is a single logical network or subnet of an IP address. Client addresses for the group are distributed dynamically within the group. Group participants will acquire a group address upon entering the group. Legacy systems having addressing fixed or determined by other mechanisms will cooperate through group routing. The group enables access, for connectivity to other groups, by providing gateways to a network backbone.

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention.

Figure 1:
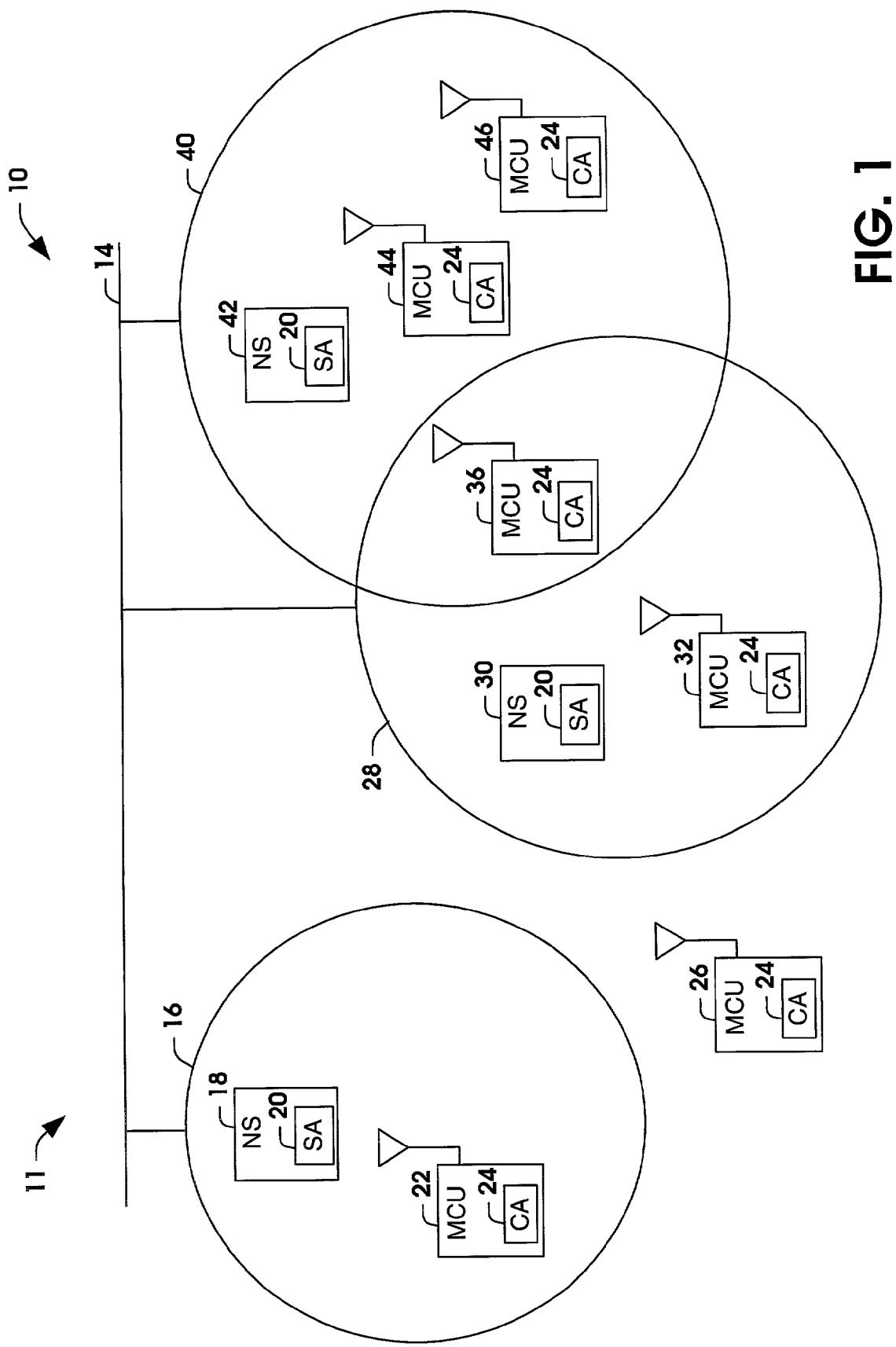
FIG. 1 illustrates a block diagram of a wireless communication system having client mobility agents and server mobility agents in accordance with an aspect of the present invention.

FIG. 1 illustrates a mobile communication system 10 comprising a plurality of logical networks or subnetworks 16, 28 and 40 coupled to a network backbone 14 to form a parent network 11 (e.g., internet, intranet). It is to be appreciated that the communication system can be comprised of one or more hierarchical levels of networks. The network backbone 14 can be a hardwired data communication path made of twisted pair cable, shielded coaxial cable or fiber optic cable, for example, or wireless (e.g., an adhoc backbone) or partially wireless in nature. Communications between logical networks are provided by a respective network server that establishes logical connections between the respective logical networks across the network backbone 14. The network server of a respective logical network provides network services for its respective network.

In one aspect of the invention, the network services include TCP/IP suite services, such as DDNS, DHCP and LDAP DS. The network services can be provided across a plurality of network devices or reside on a single network device. A primary domain controller provides administrative control of the network services for a respective logical network.

The intelligent mobility agents of the present invention support two modes of operations to facilitate continuous communication. The first mode is referred to as "Break-before-Make" mode, which supports the conditions where a user transitions between two groups and is not able to maintain continuous link connectivity. In this mode, continuous session operation is not achievable due to lack of physical connectivity however, upon entry to a new group the user is able to communicate with the new group and source connections with the entire network. The second mode is referred to as the "Make-before-Break" mode and supports the conditions where a user transitions between two groups and maintains physical link connectivity to both groups for a short period. A continuous Transmission Control Protocol/User Datagram Protocol (TCP/UDP) session operation is maintained as the user transitions from one group to another. The present invention provides user mobility mechanisms to migrate the users affiliation to a new group without user assistance or interruption (e.g., system restart) of communication equipment operation.

Figure 2:
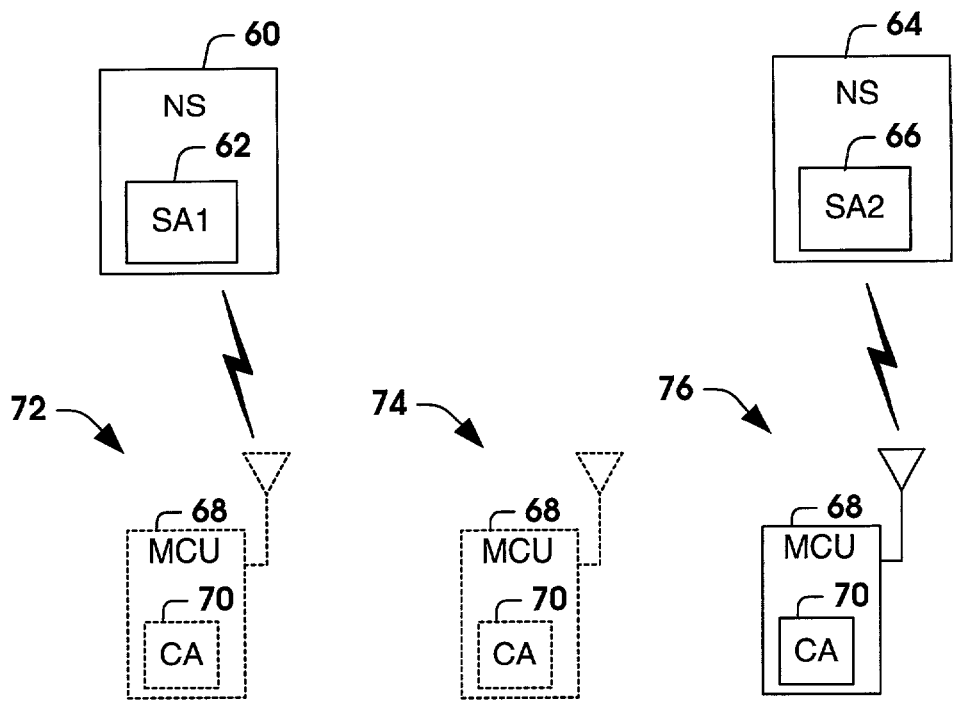
FIG. 2 illustrates a MCU transitioning between network servers in a "Break-before-Make" mode in accordance with an aspect of the present invention.

FIG. 2 illustrates a "Break-before-Make" mode where a MCU 68 having a client agent 70 is a member of a first logical group with a first network server 60 having a server agent 62. The MCU 68 has a first position 72 in which the MCU 68 is in a communicative relation with members of the first logical group and the network server 60. The MCU 68 then moves from the first position 70 to a second position 74 in which is not able to maintain a link with the network server of the first logical group and does not have any link connection to any other logical groups. The MCU 68 then moves from the second position 74 to a third position 76 in which the MCU 68 establishes a new logical connection with a second network server 64 having a server agent 66 in a second logical network. The client mobility agent 70 and the server mobility agents 62 and 66 can collaborate to provide membership of the MCU in the second logical group and remove the MCU from membership in the first logical group.

Figure 3:
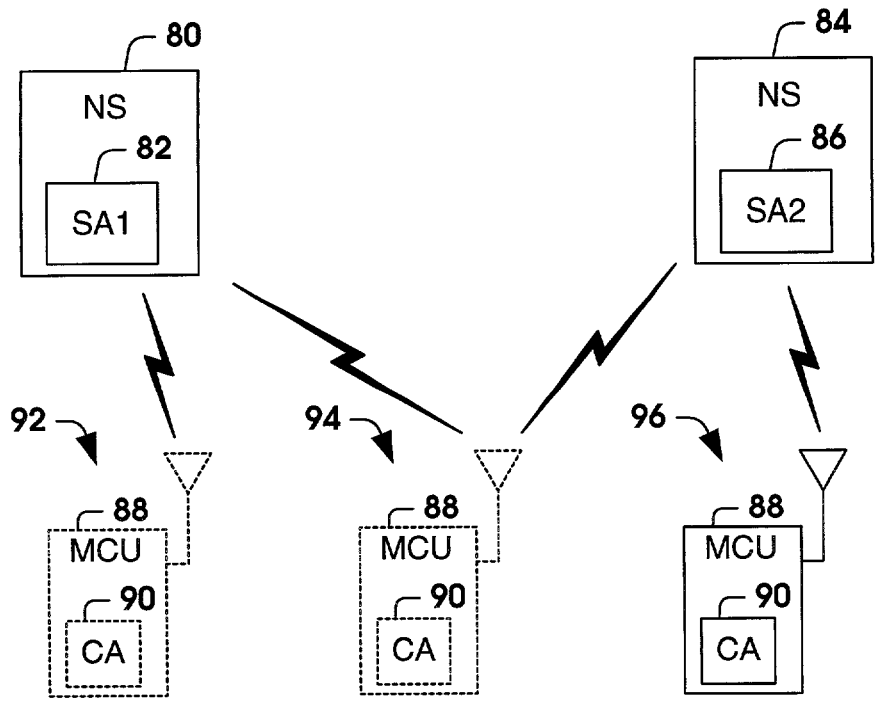
FIG. 3 illustrates a MCU transitioning between network servers in a "Make-before-Break" mode in accordance with an aspect of the present invention.

FIG. 3 illustrates a "Make-before-Break" mode where a MCU 88 having a client agent 90 is a member of a first logical group with a first network server 80 having a server agent 82. The MCU 88 has a first position 92 in which the MCU 88 is in a communicative relation with members of the first logical group and the network server 90. The MCU 88 then moves from the first position 92 to a second position 94 in which link connectivity is provided from the first logical group in addition to a second logical group with a second network server 84 having a server agent 86. The MCU 88 then moves from the second position 94 to a third position 96 in which the MCU 88 logical connection with the first logical network is lost. The MCU 88 then determines that the MCU 88 will join the second logical network. The client mobility agent 80 and the server mobility agents 82 and 86 can collaborate to provide membership of the MCU in the second logical group and remove the MCU from membership in the first logical group.

In one aspect of the invention, a common "identity" for the mobile user is maintained by utilizing standard network location Domain Name Service (DNS) to locate the mobile user anywhere in the network. The user mobility mechanisms support any voice, video, or data communications. The user mobility mechanisms support both wireless and wired operation.

Referring again to FIG. 1, a first logical network 16 includes a network server 18, a second logical network 28 includes a network server 30 and a third logical network 40 includes a network server 42. A plurality of MCUs are associated with the logical networks 16, 28 and 40. The MCUs can move between logical networks and be re-homed employing the intelligent homing agents in accordance with the present invention. The first logical network 16 has a first MCU member 22 and a second MCU member 26. The second MCU member 26 has moved outside the range of the first logical network 16 and has entered a "Break-before-Make" mode. The second logical network 28 has a third MCU member 32 and a fourth MCU member 36. The fourth MCU member 36 has moved within the range of both the second logical network 28 and the third logical network 40, such that the fourth MCU member 36 is receiving link connectivity from both networks, and therefore, has entered a "Make-before-Break" mode. The third logical network 40 has a fifth MCU member 44 and a sixth MCU member 46. Each network server 18, 30 and 42 include a server mobility agent (SA) 20 and each MCU includes a client mobility agent (CA) 24. The server mobility agents 20 and the client mobility agents 24 collaborate with one another to re-home MCUs as they move from one logical network to another.

The client mobility agents 24 monitor link metrics to determine whether to become a member in a new logical network or retain membership in a logical network. If the client mobility agent determines to join a new logical network, the client mobility agent initiates coordination with the new server mobility agent 20 to transfer current open communication session information to the new logical network. The client mobility agent then invokes a request for a new IP address to be assigned to the MCU. The new IP address can be provided using standard available services such as DHCP. Once the client mobility agent receives the new IP address, the new IP address can be associated with the MCU domain name using DDNS. The domain name and IP address can be replicated across the network utilizing directory services such as LDAP DS. The client mobility agent then initiates coordination with the new server mobility agent 20 to transfer services (e.g., e-mail, phone) associated with the MCU from the old network to the new network.

Figure 4:
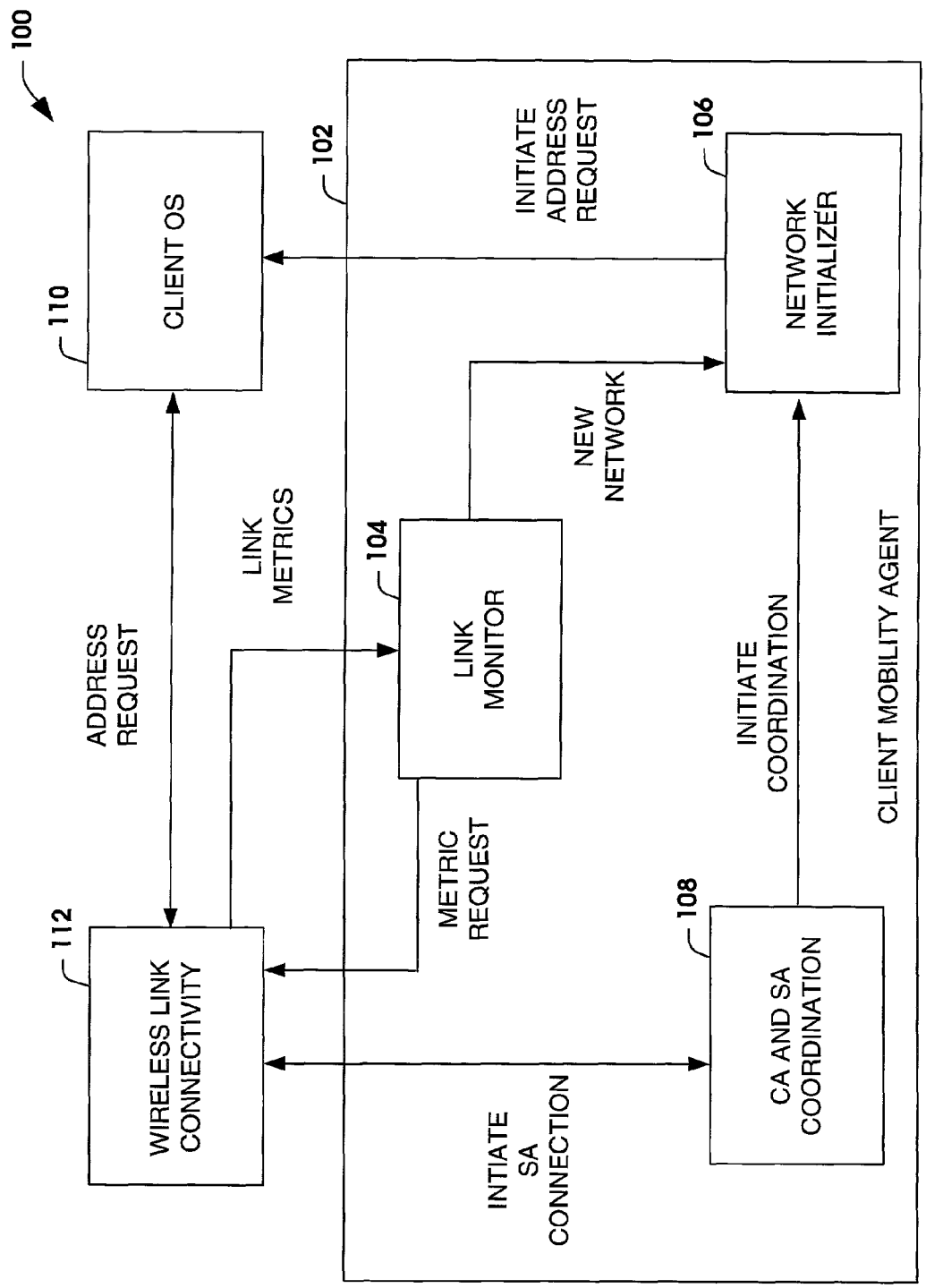
FIG. 4 illustrates a block diagram of a MCU in accordance with an aspect of the present invention.

The primary responsibility for initiating user migration detection and re-homing is within the mobile client, in the form of the client mobility agent. FIG. 4 illustrates a functional block diagram of a MCU 100 having a client mobility agent 102 in accordance with an aspect of the present invention. FIG. 4 illustrates the interactions between the client mobility agent 102, a client operating system (OS) 110 and a wireless link connectivity component 112 (e.g., session layer). The client mobility agent 102 includes a link monitor 104. The link monitor 104 monitors link metrics (e.g., source addressing, link quality, bit-error rate, access point information, access point link connectivity) within the current logical network or group. The wireless connectively component 112 can signal a loss of service and return to service when connectivity is lost and reestablished (e.g., Break-before-Make). The link monitor 104 then determines whether a logical network or group change has occurred by sampling the source address traveling on the current network via the wireless link connectivity component 112.

Alternatively, the link monitor 104 can monitor other link metrics such as signal quality of one link from a first network and a second link from a second network when connectivity is established between two or more logical networks (e.g., Make-before-Break). In either situation, the link monitor 104 can determine if a transition between logical networks is desirable based on one or more link metrics. If a transition between networks is desirable, the network initializer 106 initiates a client agent and server agent coordination routine 108, which communicates to the new network server via the wireless link connectivity component 112 relating to the transferring of current communication sessions that the MCU is associated with at the previous network. The link monitor 104 transmits a new network request that invokes a network initializer 106. The network initializer 106 initiates an address request command through an OS command line (e.g., API) to the client OS 110. The client OS 110 then invokes an address release and request. The address release and request is provided through the wireless link connectivity component 112 to the network services residing on a network server (not shown).

The address release and request can be provided employing DHCP with Intragroup updates occurring utilizing LDAP DS. For example, DHCP releases an old IP address and issues a new IP address which causes DHCP updates to a user's LDAP DS record, through an LDAP exchange, to reflect the new IP address and re-home the user to the new local network or group. The LDAP DS then provides replication of the new IP address throughout the other logical networks or groups. Once the MCU 100 receives its new assigned IP address, the network initializer 106 initiates the client agent and server agent coordination routine 108, which communicates to the new network server via the wireless link connectivity component 112. The server agents of the old network and new network cooperate to transmit information relating to current services that the MCU is associated with at the previous network. The MCU can communicate in the new group while server mobility agents initiate Intergroup updates (e.g., service transfers) to the MCUs new logical network location.

Figure 5:
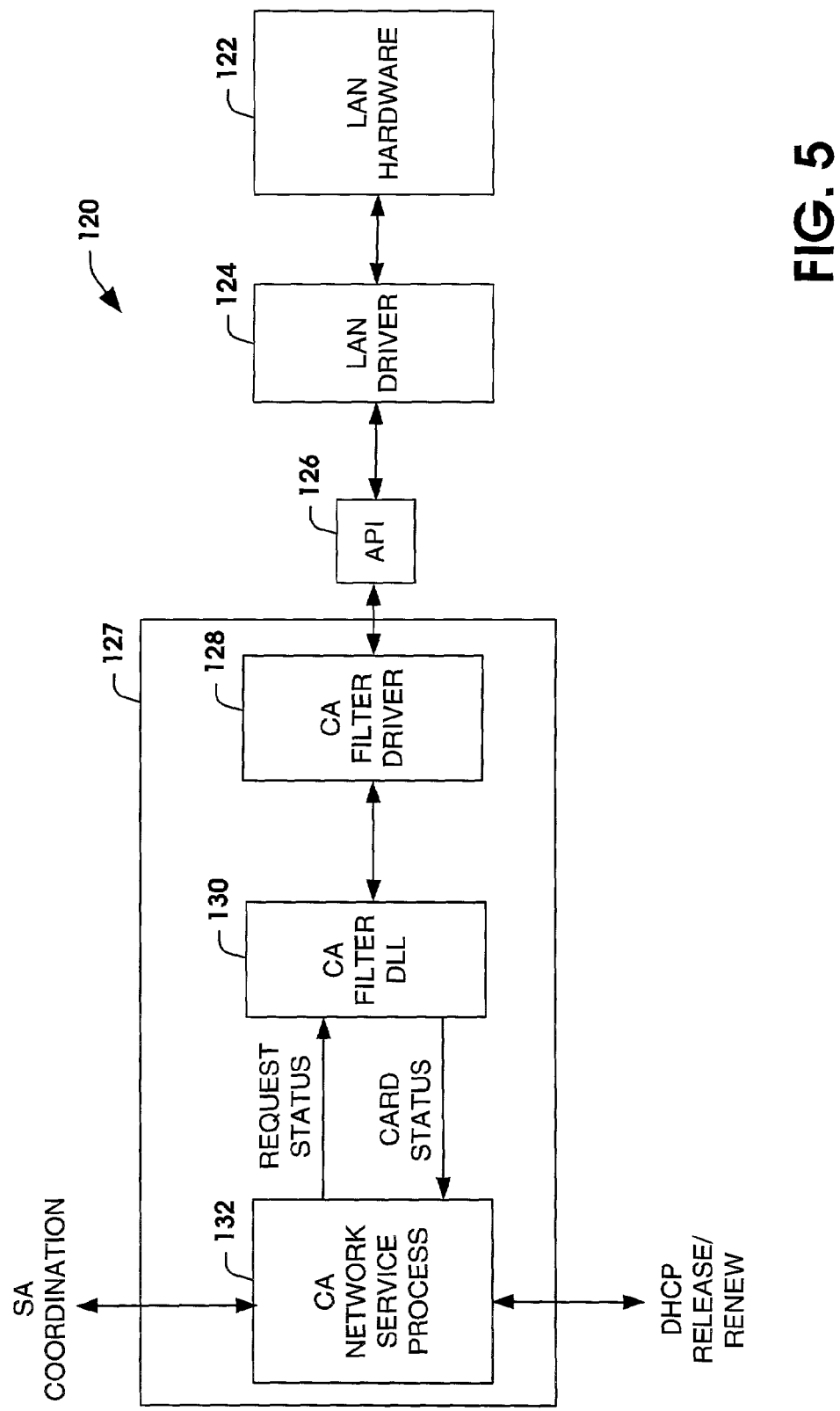
FIG. 5 illustrates a particular implementation of a client mobility agent in accordance with an aspect of the present invention.

FIG. 5 illustrates a MCU 120 having an exemplary client mobility agent (CA) 127 implementation in accordance with an aspect of the present invention. The CA 127 is a machine level entity that stands in for a human user and executes the activity necessary to re-home the MCU 120 to a new logical network or group without requiring human user interactions. The CA 127 is an autonomous agent, resident in the client (MCU 120), which identifies changes in location and executes machine level commands, to affect the MCU 120 migration from one logical network to another.

The CA 127 is a link monitor that includes a filter driver 128, a filter Dynamic Link Library (DLL) 130 and a CA network service process component 132. The filter driver 128 handles the low level requests for statistical data from a wireless Local Area Network (LAN) card 122 through an application program interface (API) 126 and a LAN driver 124. The network service process component 132 executes in the background and analyzes the data returned from the filter driver 128 to decide when to re-associate with a new subnet. The CA 127 monitors the association to the current logical network by polling the status of the client LAN card 122. This can be accomplished by monitoring an associated access point and its logical network, link connectivity source addresses, signal quality or a number of other link metrics. When detecting new associations, the CA network service process component 132 initiates a DHCP release and renew to obtain an IP address for the new association.

The CA filter driver 128 is an upper filter driver residing above the LAN device driver 124. The CA filter driver 128 captures IO Request Packets (IRP's) generated by the CA 127. The network service portion 132 of the CA 127 is a background service process analyzing the data returned from the filter driver 128 and implementing various states, such as initiations of DHCP release/renew and server agent coordination. The CA filter DLL 130 manages the interface to the CA filter driver 128 and runs as a background process. Alternatively, a daemon can be employed instead of a DLL based on the operating system being ultilized at the MCU 120. The DLL 130 performs actions based on predefined criteria. The filter driver 128 communicates through the LAN driver 124 to obtain the results indicated by the code contained in the IRP's. The network service portion 132 of the CA communicates through the DLL 130, to the filter driver 128, obtaining status information from the wireless LAN card 122. The DLL 130 uses the data to determine when to initiate an operating system DHCP release and renew cycle. Once the IP address is renewed, a SA coordination routine is invoked, and the client process returns to monitoring of the wireless LAN card 122.

Figure 6:
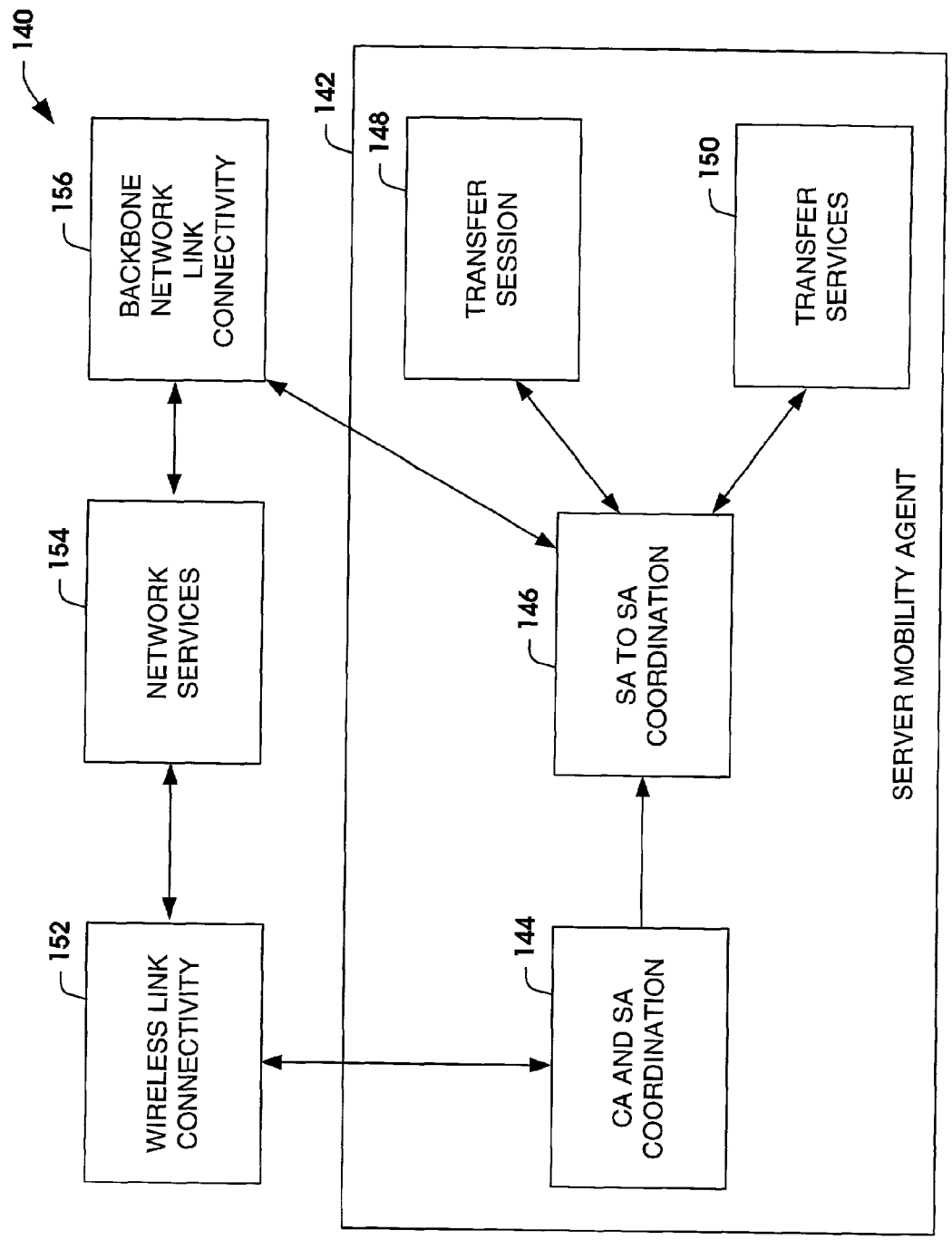
FIG. 6 illustrates a functional block diagram of a network server in accordance with an aspect of the present invention.

FIG. 6 illustrates a functional block diagram of a network server 140 having a server mobility agent 142 in accordance with an aspect of the present invention. The server mobility agent 142 communicates with the client mobility agent to perform a variety of functions in accordance with the present invention. The network services 154 receive a request for a new address (e.g., IP address) through a wireless link connectivity component 152 from a client mobility agent when a MCU determines that it desires to enter a new logical network or group. In one aspect of the invention, the network services 154 receive a new address request in the form of a DHCP request and release through the wireless link connectivity component 152. DHCP releases the old address and issues a new IP address to the client agent through the wireless link connectivity component 152. DHCP then invokes LDAP DS residing in the network services 154 to inform other groups of the MCUs new IP address. The LDAP DS then provides replication of the new IP address throughout the other logical networks or groups via a backbone network link connectivity component 156. The LDAP DS then interacts with a DDNS service in the network services 154. The network services 154 manage user traceability by maintaining the current IP address associated with the user's domain name across both local and wide area environments.

Once the MCU has been assigned a new IP address, the network server 140 receives an initialization to a client agent and server agent coordination routine 144 via the wireless link connectivity component 152. The client agent and server agent coordination routine 144 receives information relating to associations of the MCU at the previous network. The client agent and server agent coordination routine 144 then invokes a server agent to server agent coordination routine 146. The server agent to server agent coordination routine 146 is provided with information relating to the MCU, which includes information relating to the group or logical network that the MCU was previously a member, the previous IP address, current session information and current available services (e.g., e-mail, phone).

The server agent to server agent routine 146 establishes a connection between the network server of the new group and the old group through the backbone network link connectivity component 156. If a current session is in progress, the server agents transfer the current session before the CA releases the IP address of the old logical network using a transfer session component 148 of the new and/or the old logical network server. The server mobility agent 142 then transfers services from the old logical network to the new logical network using a transfer services component 150 of the new and/or the old logical network server. For example, the transfer services component 150 of the new network can build a new electronic mailbox, and be operative to receive messages from the old mailbox of the old network. The transfer services component of the old network can be adapted to disassemble the old mailbox, and transfer any messages to the new mailbox of the new network.

Figure 7:
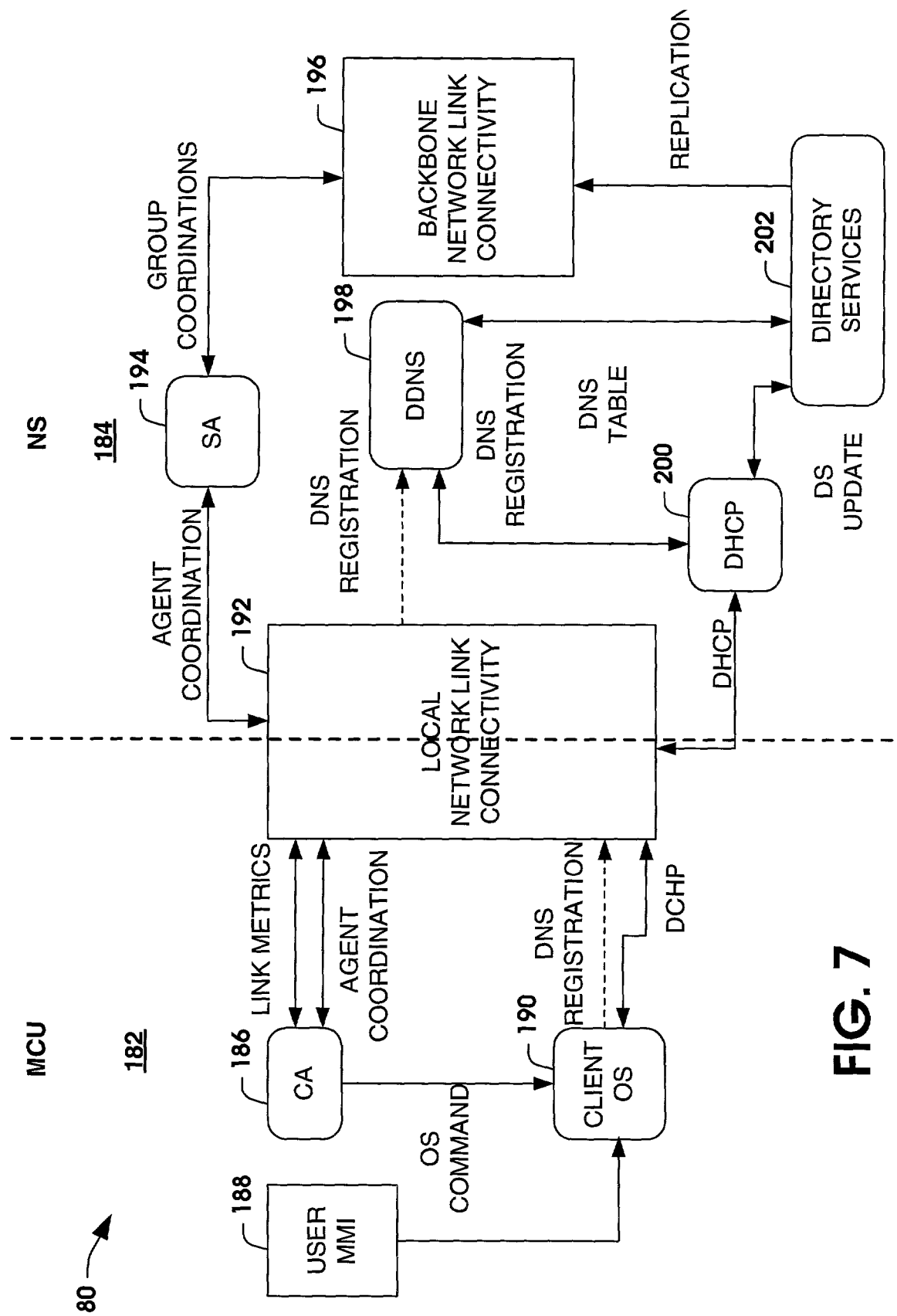
FIG. 7 illustrates a service block diagram in accordance with an aspect of the present invention.

FIG. 7 illustrates a service block diagram 180 relating to interaction between a MCU 182 and a network server (NS)

184 in accordance with an aspect of the present invention. The MCU 182 includes a user man machine interface (MMI) 188 coupled to a client operating system (OS) 190 to allow a user to provide communication to and from the client operating system 190. The MCU 182 includes a client mobility agent (CA) 186. The client mobility agent 186 monitors link metrics through a local network link connectivity component 192. The client mobility agent 186 determines whether or not to enter a new network based on the monitoring of the link metrics. If the client mobility agent 186 determines it wishes to enter a new network, a command is issued to the client operating system for a DHCP request and release. The client OS 190 then initiates a DHCP exchange through the local network link connectivity component 192 to a DHCP service 200 residing on the network server (NS) 184. The DHCP exchange re-affiliates the host with the new domain, obtains an IP address, and updates the LDAP DS using directory services 202.

The client operating system then initiates a DNS registration via a DDNS service 198 through the local network link connectivity component 192, which causes the LDAP DS to interact with DDNS services 198 to update a DNS table repository. The LDAP DS or directory services 202 detects the DNS table repository update and replicates the DNS table repositories of other groups via replication in the intranet using the backbone network link connectivity component 196. The managing of the user traceability is maintained by associating the current IP address with the user's fully qualified domain name (FQDN) and enunciating a users location, via DDNS, across both local and wide area environments.

Once the client has completed the client initiated DNS registration, the CA 186 initiates a client agent to server agent coordination routine between the CA 186 and a server mobility agent (SA) 194. The SA 194 receives information relating to the old network from which the MCU was a member and establishes a SA to SA group coordination routine through the ad-hoc backbone network link connectivity component 196. If the migrate operation is a "Make-before-Break", the SA to SA group coordination routine affects the transfer of current TCP and UDP sessions of the MCU from the old network to the new network prior to disconnecting from the old group. The SA to SA group coordination routine also affects the transfer of services (e.g., e-mail, phone) to the new network. The CA then returns to monitoring link metrics, while the SA returns to monitoring the invocation of a CA to SA coordination routine.

The present invention can achieve collaboration between the user and standard services by employing intelligent agents (both client and server based) operating above the session layer without disturbing the network layer. The approach of the present invention requires no modification to network layer routing and supports both unicast and multicast operations. End point host hardware, operating system, networking software and application software remain unchanged with the addition of intelligent mobility agents added to mobile users provide the necessary mobility services, requiring no man-in-the loop restart or other management of a host.

Agents (both client and server agents) replace man-in-the-loop operations (restart or interactive management) by detecting migration events and initiating DHCP re-affiliations (without powering down the host), managing parameter updates, and executing service migrations. User communications are continuous and tracking from location to location is intrinsic within the standard services, so, a user is always findable by other entities (users, SA functions, network management and security function, etc.). The mobility agents enable collaboration between the standard services, client operating systems, and server operating systems. LDAP DS applications support both local and wide area user migrations by providing unique user traceability through Standard Fully Qualified Domain Name (FQDN) definitions. Current LDAP DS implementations allow dynamic update capabilities through LDAP with a standardized network protocol.

Each group provides the network services supporting the logical network or subnet for the group. The group network services support all mobile users, referred to as clients, in the group. Intelligent server agents, resident in the group network services, coordinate mobile user migrations to or from the group with other groups for notification to the larger network or internet. The mobile client or MCU is responsible for initiating mobility processes associated with transitions to or from a group. Intelligent client mobility agents, resident in the mobile user, detect and sequence the transition of a client from one group to another. Client mobility agents also coordinate with server mobility agents to affect transfers of email and/or phone services, maintain continuous TCP/UDP sessions, and manage notification within the greater network as to the client's location.

All of the user mobility activity relies on network and link layers to provide transport of information, however, migration decisions and re-homing of a client does not rely on modification of standard network and link layer protocols. The present invention provides the mobility task out of the network and link layers. The present invention utilizes the application through session layers for managing, tracking, and migrating users with transparent (no user interaction required after initial login) operations. The intelligent mobility agents can utilize industry standard protocols and APIs to interface with COTS operating systems and network services forming the collaboration between the commercial components. Routing protocols represent no constraints that affect the ability to migrate and track users.

Figure 8:
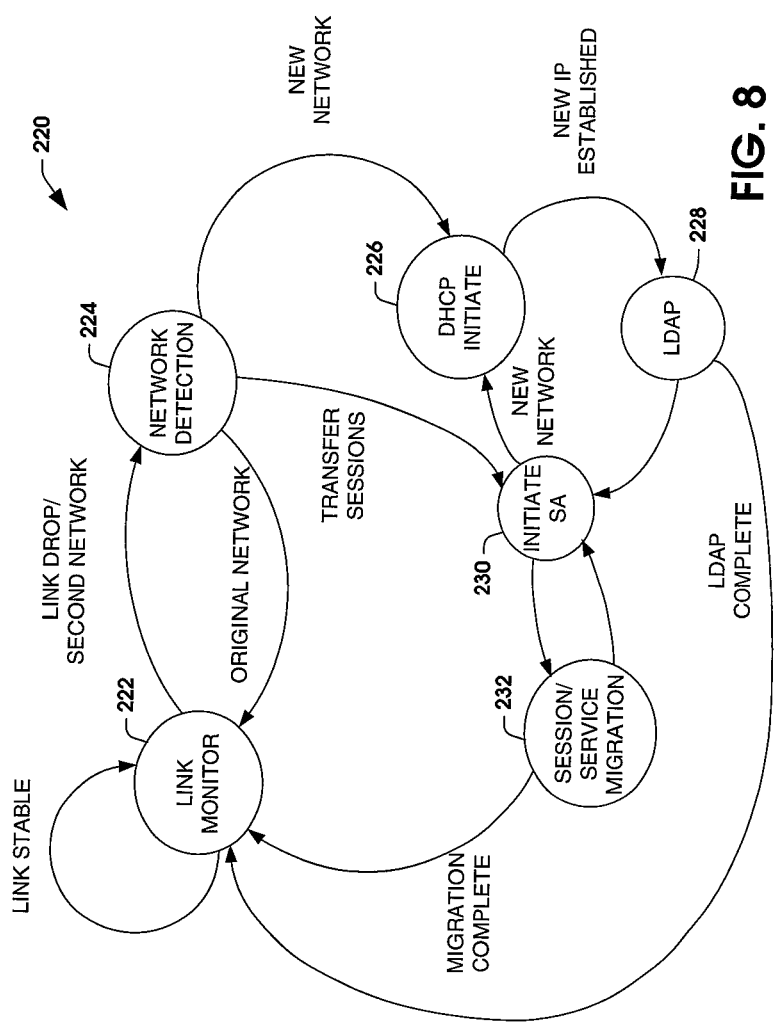
FIG. 8 illustrates a state diagram for transitioning a MCU between logical networks in accordance with an aspect of the present invention.

FIG. 8 illustrates a state diagram 220 of an intelligent agent mobility collaboration routine in accordance with an aspect of the present invention. The state diagram begins at a link monitor state 222 where monitoring of link metrics is performed. If the link is stable, the state diagram repeats the link monitoring state 222. If the link is dropped or link metrics is detected from one or more additional networks, the state diagram proceeds to a network detection state 224. At the network detection state 224, decisions are rendered about whether the mobile client should register at the new network. For example, if the link is dropped and the link is now detected in a different network, the mobile client would proceed to enter the new network. Alternatively, if link activity is detected from a second network, the network detection state would determine if the signal quality of the second network has reached a threshold level that would make it desirable for the mobile client to enter the second network. Additionally, link metrics can be performed through access points. The mobile client would remain in the current network if the new access point was in the current network or choose to enter a new network if the access point was a member of the new network.

If the decision to remain in the network is made at the network detection state 224, the state diagram returns to the link monitor state 222. If the decision is made to enter a new network, a decision is made whether the transfer was a "Break-before-Make" transfer or a "Make-before-Break" transfer. If the transfer is a "Make-before-Break" transfer, the state diagram moves to an initiate SA coordination state 230. The initiate SA coordination state 230 invokes a session migration state 232 at the server agent and invokes a DHCP initiate state 226. If the transfer is a "Brake-before-Make" transfer, the state diagram moves directly to the DHCP initiate state 226. The DHCP initiate state 226 releases the old IP address and assigns a new IP address, which is provided into the DNS table repository by dynamic editing. The DHCP initiate state 226 then advances to perform a LDAP state 228 and initiate a SA coordination state 230. The LDAP state 228 replicates the new address of the mobile client domain name to other networks, and returns to the initiate SA coordination state 230. The initiate SA coordination state 230 invokes a service migration state 232 at the server agent, while the client agent returns to the link monitor state 222. The service migration state 232 returns to the link monitor state 222 once the migration of services is complete.

Figure 9:
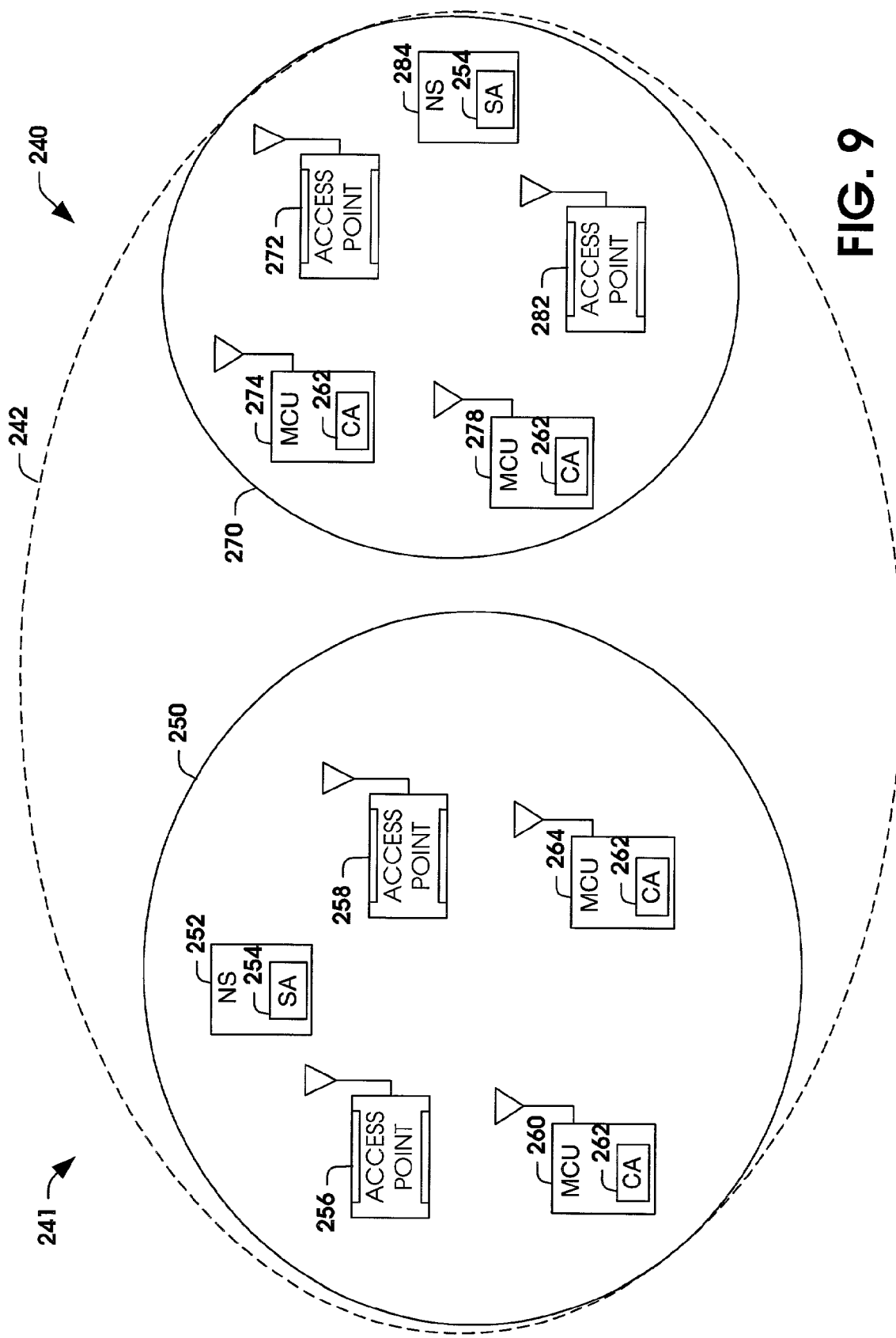
FIG. 9 illustrates a block diagram of a wireless communication system having access points in accordance with an aspect of the present invention.

As previously mentioned, link connectivity can be ascertained through access points as opposed to through network servers and/or other MCUs. FIG. 9 illustrates a mobile communication system 240 comprising a plurality of logical networks or subnetworks coupled to a backbone 242 to form a parent network 241 (e.g., internet, intranet). The mobile communication system 240 includes a first logical network 250 having a network server 252 and a second logical network 270 having a network server 284. A plurality of MCUs are associated with the logical networks 250 and 270. The MCUs can move between logical networks and be re-homed employing the intelligent homing agents in accordance with the present invention.

The first logical network 250 has a first MCU member 260 and a second MCU member 264. The second logical network 270 has a third MCU member 274 and a fourth MCU member 278. The first logical network 250 includes a first access point 256 and a second access point 258, while the second logical network 270 includes a third access point 272 and a fourth access point 282. Each access point serves as an entrance point through which wireless communications can occur with the backbone 242 and, thus the mobile stations and access points in the system 240. As is conventional, each MCU associates itself, typically by registration, with an access point coupled to the backbone 242, such that a link is formed between itself and other devices situated on the backbone 242. Each access point is capable of wirelessly communicating with other devices in the communication system 240 via respective antennas. A geographic cell (not shown) associated with each access point defines a region of coverage in which successful wireless communication can occur. Depending on the type of antenna selected, output power and RF sensitivity of the respective access point, the geographic cell may take one of several different forms and sizes.

Each network server 252 and 284 include a server mobility agent (SA) 254 and each MCU includes a client mobility agent (CA) 262. The server mobility agents 254 and the client mobility agents 262 collaborate with one another to re-home MCUs as they move from one logical network to another. The client mobility agents 262 monitor link metrics associated with registration and deregistration with a respective access point to determine whether to become a member in a new logical network or retain membership in a logical network. If a new access point is detected, it is determined if it is in a different network or in the same network. If the access point is in the same network, the client mobility agent continues to monitor link metrics. If the client mobility agent determines that the access point is in a new logical network, the client mobility agent invokes a request for a new IP address to be assigned to the MCU. The new IP address can be provided using standard available services such as DHCP. Once the client mobility agent receives the new IP address, the new IP address can be associated with the MCU domain name using DNS or dynamically associated using DDNS. The domain name and IP address can be replicated across the network utilizing directory services such as LDAP DS. The client mobility agent 262 also initiates coordination with the new server mobility agent 254 to transfer current open session information and to transfer services (e.g., e-mail, phone) associated with the MCU from the old network to the new network.

Figure 10:
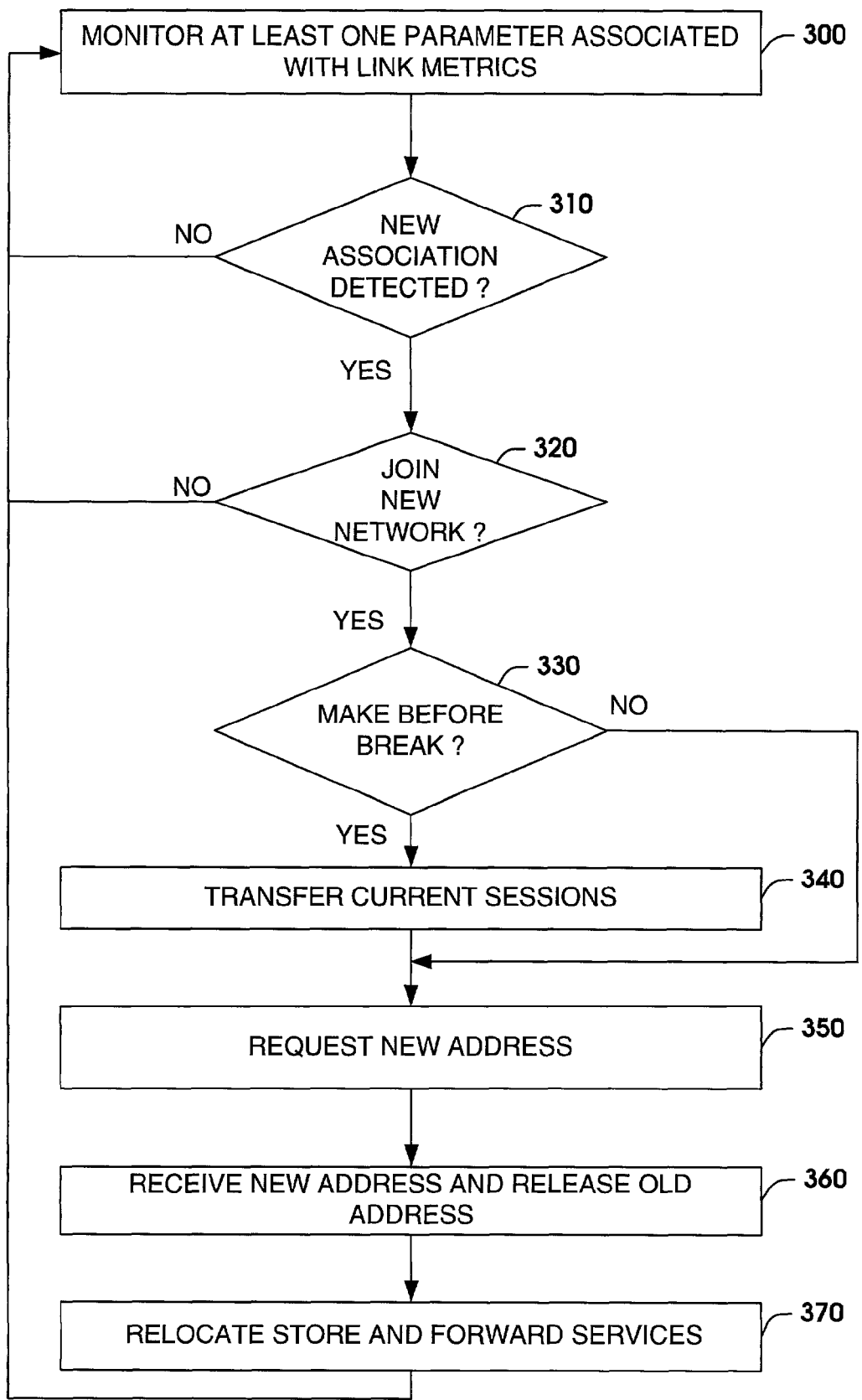
FIG. 10 illustrates a flow diagram of a methodology for transitioning MCUs between logical groups in accordance with an aspect of the present invention.
Figure 11:
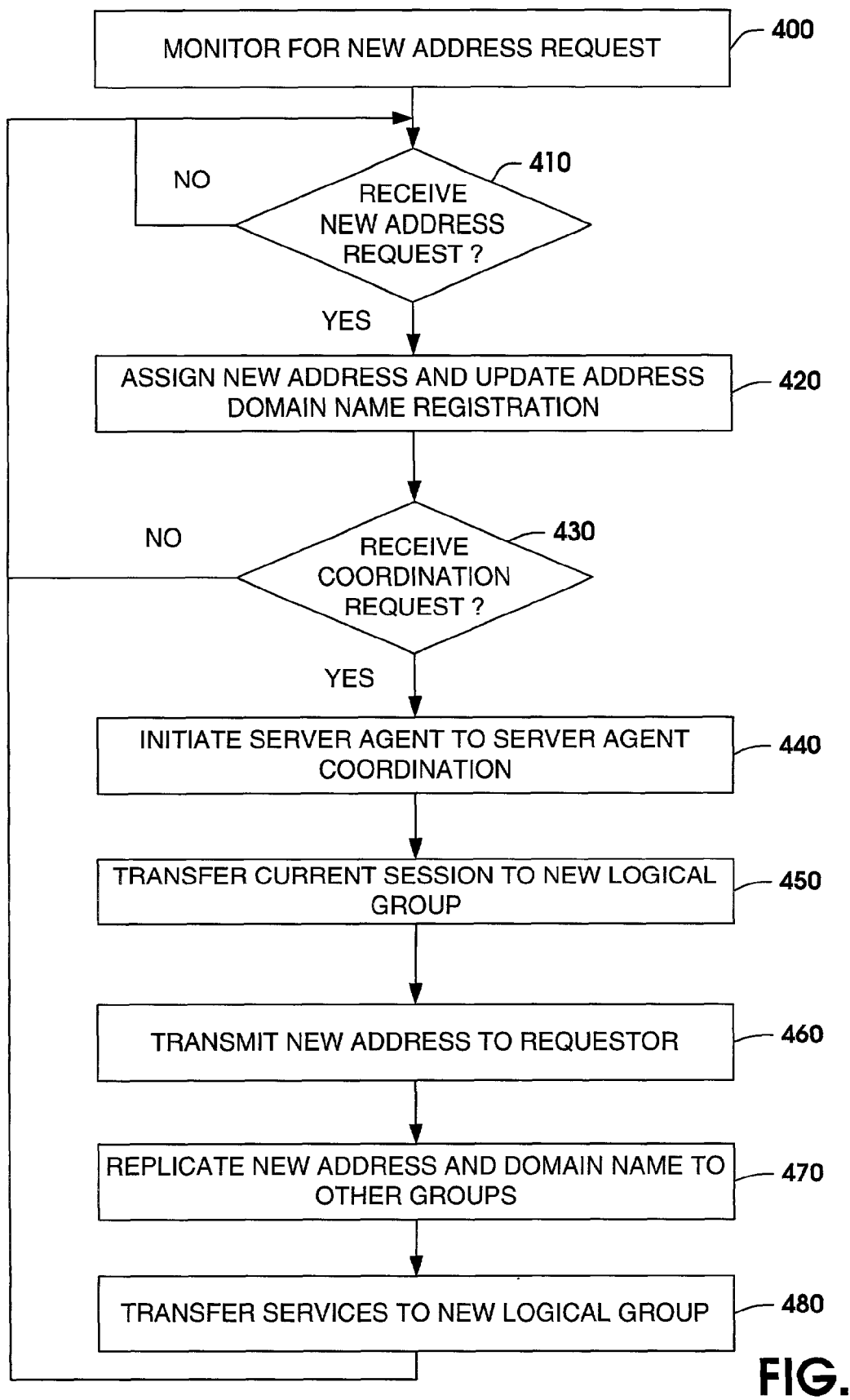
FIG. 11 illustrates a flow diagram of a methodology for executing network services for transitioning MCUs between logical groups in accordance with an aspect of the present invention.

In view of the foregoing structural and functional features described above, methodology in accordance with various aspects of the present invention will be better appreciated with reference to FIGS. 10-11. While, for purposes of simplicity of explanation, the methodology of FIGS. 10-11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates a methodology for transitioning MCUs between groups in accordance with an aspect of the present invention. The methodology begins at 300 where at least one parameter associated with link metrics is monitored. For example, the at least one parameter can be source addressing, access point link connections, or signal quality. Source addressing and access point link connections can be used in a "Break-before-Make" mode, while signal quality can be employed in a "Make-before-Break" mode. It is to be appreciated that a variety of different link connectivity parameters in addition to the ones discussed above can be employed in accordance with the present invention. The monitoring can be achieved by using a client mobility agent residing on a MCU. The methodology then proceeds to 310.

At 310, the methodology determines if a new association has been detected based on the at least one parameter associated with link metrics. If a new association is not detected (NO), the methodology returns to 300 to continue monitoring at least one parameter associated with link metrics. If a new association is detected (YES), the methodology advances to 320. At 320, the methodology determines whether to join a new network. If the methodology determines that it is not desirable to join a new network (NO), the methodology returns to 300 to continue monitoring at least one parameter associated with link metrics. For example, link connectivity of a new access point can be detected such that a new association has been detected, but if the access point is in the same logical network it would be desirable to remain in the same logical network. Additionally, if link connectivity is detected from more than one network, but the signal quality of the other networks, besides the one that the MCU is a member, has not reached a predetermined threshold then it would not be desirable to join any of those networks. Therefore, the MCU would remain a member of the current network. If the methodology determines that it is desirable to join a new network (YES), the methodology advances to 330.

At 330, the methodology determines if the transition between groups was a result of a "Make-before-Break" mode. If the methodology determines the transition between groups was a result of a "Make-before-Break" mode (YES), the methodology proceeds to 340. At 340, the methodology initiates a server agent coordination routine that provides the transfer of current communication sessions from the old network to the new network. The methodology then advances to 350. If the methodology determines the transition between groups was not a result of a "Make-before-Break" mode (NO) (e.g., "Break-before-Make" mode), the methodology proceeds to 350.

At 350, a new address is requested for the MCU from the new logical network. The request for the new address can be made, for example, by invoking a DHCP request which will lease a new IP address to the MCU. At 360, a new IP address is received and the old IP address is released. The methodology then proceeds to 370. At 370, the methodology initiates a server agent coordination routine that provides the relocation of store and forward services associated with the MCU to the new logical network from the old logical network. The methodology then returns to 300 to repeat the monitoring of at least one parameter associated with link metrics.

FIG. 11 illustrates a methodology for executing network services for transitioning MCUs between groups in accordance with an aspect of the present invention. The methodology begins at 400 where a new address request is received for an MCU desiring to join the logical group or network. At 410, the methodology determines if a new address request is received. If a new address request is not received (NO), the methodology continues to monitor for a new address request. If a new address request is received (YES), the methodology advances to 420. At 420, the methodology assigns a new address to the new MCU group member and updates the domain name registration server to reflect the MCU domain name and IP address. A new IP address can be assigned using a DHCP service, which then can update a domain name server repository table via DDNS, such that the MCU is provided with a fully qualified domain name and respective IP address associated with the fully qualified domain name.

At 430, the methodology determines if a coordination request is received from the MCU. If a coordination request is not received from the MCU (NO), the methodology returns to 400. If a coordination request is received from the MCU (YES), the methodology advances to 440. At 440, a server agent to server agent coordination routine is initiated. The server agent to server agent routine can include one or more handshaking routines to transfer information from the old network to the new network with respect to the new MCU group member. The current session (e.g., TCP session, UDP session) is then transferred to the new logical network at 450 if the transition is a "Make-before-Break" transition. At 460, the new address is provided to the requester. The new address and fully qualified domain name are then replicated to the other logical groups to provide the groups in the overall network (e.g., intranet) with the new address and fully qualified domain name of the MCU at 470. The methodology then proceeds to 480.

At 480, the services associated with the MCU are transferred to the new logical group or network from the old logical group or network. This can include the assembling of a new electronic mailbox at the new logical network and disassembly of the old electronic mailbox at the old logical network. Additionally, this can include the transfer of mail messages from the old electronic mailbox to the new electronic mailbox. The methodology then returns to 400 to continue monitoring for new address requests.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wireless communication system including a network that conforms to the Open System Interconnection (OSI) Reference Model comprising:
a mobile communication unit having a client mobility agent that resides on the mobile communication unit, the client mobility agent monitors link metrics associated with communications between the mobile communication unit and subnets of a network, the client mobility agent determines if a transition between subnets in the network is desirable based on the monitored link metrics, wherein the client mobility agent operates above a session layer of the network; and
a network server having a server mobility agent that resides on the network server, the server mobility agent collaborates with the client mobility agent to transition the mobile communication unit from membership from the old subnet of the network to the new subnet of the network upon invocation from the client mobility agent, the mobile communication unit being assigned a new address corresponding to the new subnet of the network.

2. The system of claim 1, the server mobility agent being a first server mobility agent residing on a network server of the subnet of the network.

3. The system of claim 2, further comprising a second server mobility agent residing on a network server of the old subnet of the network, the first server mobility agent collaborating with the second server mobility agent to transfer services associated with the mobile communication unit from the old subnet of the network to the new subnet of the network.

4. The system of claim 3, the services being one of e-mail services and phone services.

5. The system of claim 2, further comprising a second server mobility agent residing on a network server of the old subnet of the network, the first server mobility agent collaborating with the second server mobility agent to transfer a current communication session associated with the mobile communication unit from the old subnet of the network to the new subnet of the network.

6. The system of claim 5, the communication session being one of a Transmission Control Protocol (TCP) session and a User Datagram Protocol (UDP) session.

7. The system of claim 1, the monitored link metrics being signal quality associated with link connectivity of the subnets of the network, the client mobility agent utilizing the signal quality to determine if a transition between subnets of the network is desirable.

8. The system of claim 1, the client mobility agent invoking a new address request from the new subnet of the network upon selecting between subnets of the network.

9. The system of claim 8, the new address request being received and executed by a Dynamic Host Configuration Protocol (DHCP) service residing on a network server of the new subnet of the network, the DHCP service leasing a new Internet Protocol (IP) address associated with the new subnet of the network to the mobile communication unit.

10. The system of claim 9, the client mobility agent receives the new IP address and registers a domain name and the new IP address with a Dynamic Domain Name Server (DDNS) service.

11. The system of claim 10, a Lightweight Directory Access Protocol (LDAP) Directory Services (DS) replicating the registered domain name and the new IP address with subnets of the network.

12. The system of claim 8, the client mobility agent invoking a client agent to server agent coordination routine, the client agent to server agent coordination routine invokes a server agent to server agent coordination routine that transfers at least one of current session and current services from the old subnet of the network to the new subnet of the network.

13. The system of claim 1, wherein the link metrics comprises source addressing associated with link connectivity of the subnets of the network, the client mobility agent utilizes the source addressing to determine if a transition between subnets of the network is desirable.

14. A mobile communication unit for communicating with a network that conforms to the Open System Interconnection (OSI) Reference Model comprising:
- a link monitor that monitors link metrics associated with communications between the mobile communication unit and subnets of the network, the link monitor determines if a transition between subnets of the network is desirable based on the monitored link metrics, the link metrics comprising access point link connectivity of at least one subnet of the network, the link monitor comprising a filter driver that monitors link connectivity via a Local Area Network (LAN) driver and a Dynamic Link Library (DLL) that provides an interface with a network service process and the filter driver, the network service process determines whether a transition between subnets of the network is desirable based on the link connectivity, the link monitor using the access point link connectivity to determine whether a transition between subnets of the network has occurred, wherein the link monitor operates above a session layer of the network; and
- a network initializer that invokes a new address request from a new subnet of the network if the link monitor determines that a transition between subnets of the network is desired.

15. The mobile communication unit of claim 14, the link metrics further comprising source addressing associated with link connectivity of the subnets of the network, the link monitor using the source addressing to support a Break-before-Make mode transition between subnets of the network.

16. The mobile communication unit of claim 14, the link metrics further comprising signal quality associated with link connectivity of at least one subnet of the network, the link monitor using the signal quality to support a Make-before-Break mode transition between subnets of the network.

17. The mobile communication unit of claim 14, the new address request being a request for a new Internet Protocol (IP) address associated with the new subnet of the network.

18. The mobile communication unit of claim 14, further comprising a server agent to server agent coordination routine that is invoked prior to receipt of the new address associated with the new subnet of the network to collaborate the transfer of current session information and is invoked after receipt of the new address associated with the new subnet of the network to collaborate the transfer of current services to the new subnet of the network.

19. A wireless communication system having a plurality of mobile communication units grouped into a plurality of subnets of a network that conforms to the Open Systems Interconnect (OSI) reference model, the system comprising:
- means for monitoring, at the plurality mobile communication units, link metrics associated with communications between a mobile communication unit and subnets of the network, wherein the means for monitoring operates above a session layer of the network;
- means for determining, at the plurality of mobile communication units, if a transition of a mobile communication unit between subnets of the network is desirable based on the monitored link metrics, wherein the means for determining operates above a session layer of the network;
- means for providing a new address for a mobile communication unit desiring a transition of membership between subnets of the network, the new address associated with membership in a new subnet of the network;
- means for transferring current session information relating to the mobile communication unit to the new subnet of the network; and
- means for replicating the newly assigned address to other subnets of the network.

20. The system of claim 19, further comprising means for transferring services relating to a mobile communication unit to the new subnet of the network, wherein the means for transferring services operates above a session layer of the network.

21. A method for transitioning a mobile communication unit between subnets of a network that conforms to the Open Systems Interconnect (OSI) reference model, the method comprising:
- monitoring link metrics, at the mobile communication unit, associated with communications between the mobile communication unit and subnets of the network, wherein the monitoring occurs above a session layer of the network;
- determining, at the mobile communication unit, if a transition of the mobile communication unit between subnets of the network is desirable based on the link metrics, wherein the determining occurs above a session layer of the network;
- requesting a new address for the mobile communication unit associated with the new subnet of the network upon determining a desirable transition;
- associating the new address with a domain name of the mobile communication unit; and
- replicating the new address and associated domain name to other other subnets of the network.

22. The method of claim 21, further comprising transferring current session information to the new subnet of the network.

23. The method of claim 21, further comprising transferring services associated with the mobile communication unit to the new subnet of the network.

24. The method of claim 21, the monitoring link metrics comprising monitoring signal quality associated with link connectivity of the subnets of the network.

25. The method of claim 21, the requesting a new address comprising executing a Dynamic Host Configuration Protocol (DHCP) service residing on the new subnets of the network, the DHCP service leasing a new Internet Protocol (IP) address associated with the new subnets of the network to the mobile communication unit.

26. The method of claim 21, the associating a new address with the domain name comprising registering a new IP address and domain name with a Dynamic Domain Name Server (DDNS) service.

27. The method of claim 21, the replicating the new address and an associated domain name to other subnets of the network by employing Lightweight Directory Access Protocol (LDAP) Directory Service (DS) to replicate the registered domain name and a new IP address to other subnets of the network.

28. The method of claim 21, wherein the monitoring link metrics further comprises monitoring source addresses associated with link connectivity of the subnets of the network.

* * * * *